O. E. NESS.
NUT LOCK.
APPLICATION FILED MAY 3, 1916.
1,201,078.
Patented Oct. 10, 1916.
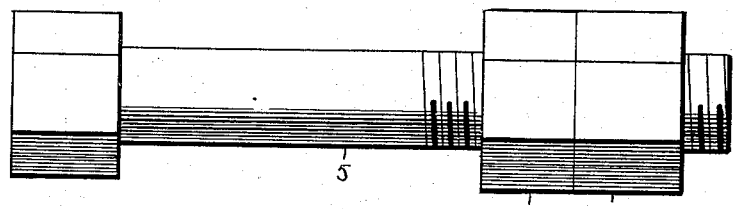
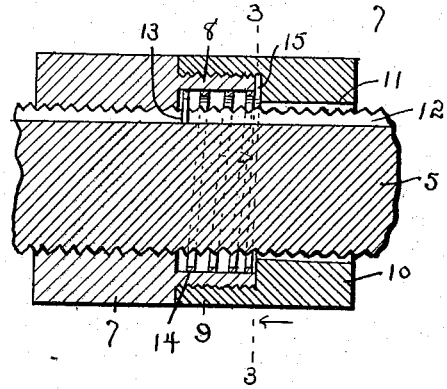
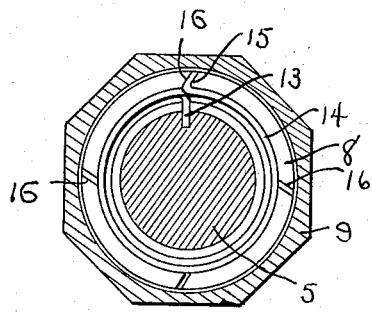
Inventor
O. E. Ness.
Witnesses
By
Attorney

UNITED STATES PATENT OFFICE.

OLIVER E. NESS, OF BRIDGEPORT, CONNECTICUT.

NUT-LOCK.

1,201,078.  Specification of Letters Patent.  Patented Oct. 10, 1916.

Application filed May 3, 1916. Serial No. 95,169.

*To all whom it may concern:*

Be it known that I, OLIVER E. NESS, a citizen of the United States, residing at Bridgeport, in the county of Fairfield and State of Connecticut, have invented certain new and useful Improvements in Nut-Locks; and I do hereby declare the following to be a full, clear, and exact description of the invention, such as will enable others skilled in the art to which it appertains to make and use the same.

This invention relates to improvements in nut locks, and has for its primary object to provide a device of this character embodying means for positively locking a nut against rotational movement upon a bolt and which is resilient in its action and normally tends to advance the nut against the object.

With this and other objects in view, the invention consists in the novel construction, combination and arrangement of parts as will be hereinafter specifically described, claimed and illustrated in the accompanying drawing, in which:

Figure 1 represents a side elevation of the improved nut lock, Fig. 2 represents a fragmentary longitudinal sectional view, and Fig. 3 represents a transverse sectional view on the line 3—3 of Fig. 2.

Referring to the drawing in detail, wherein similar reference numerals designate corresponding parts throughout the several views, the numeral 5 indicates the shank of a preferred type of bolt having the usual external screw threads 6 extending inwardly from one end upon which is fitted a nut 7.

The nut is formed, concentrically of the bore thereof, with a laterally projecting flange 8, having external screw threads which are preferably pitched oppositely to the external screw threads 6 on the bolt, and are adapted to co-act with an internally screw threaded flange 9 of a protecting nut 10, having a plane bore 11 of such diameter as to movably receive the bolt 5.

The bolt is formed with a longitudinal slot 12 receiving the inwardly directed end 13 of a coil spring 14, which is housed within the flange 8 of the main nut 7 and the outer terminal 15 thereof is directed outwardly and selectively engaged in one of the grooves 16 formed in the outer edge of the flange 8. The protecting nut 10 is adapted to abut the adjacent edge of the flange 8 of the main nut, as clearly shown in Fig. 2, and thus retain the angular end 15 of the spring locking element in operative position.

From the foregoing, it is clearly evident that the coil spring 14, having one end engaged in the slot 12 in the bolt and the other end engaged in the groove 16 of the nut, effectively locks the latter against rotational movement upon the bolt, and, in addition, said spring may be slightly contracted when applied and will thus normally tend to advance the nut 7 upon the bolt.

What I claim is:

1. A nut lock comprising a bolt, a nut fitted upon said bolt, an annular and laterally projecting flange carried by said nut, a coil spring locking element arranged in said flange and engaged at its opposite ends with said bolt and said nut for locking the latter against rotational movement upon the bolt, and means coöperating with the exterior of the flange of said nut for retaining said coil spring in operative relation to said nut.

2. A nut lock comprising a bolt, a nut fitted upon said bolt, an annular externally screw threaded flange formed concentrically with the bore of said nut and projecting laterally of the latter and having a plurality of grooves in the outer edge thereof, a coil spring locking element engaged at one end with said bolt and having the opposite end directed angularly and engaged in one of the grooves in said flange, and means slidably mounted on said bolt, and coöperating with the threads on said nut normally retaining said spring in operative relation to said nut.

3. A nut lock comprising a bolt, a nut fitted upon said bolt, a laterally projecting flange formed upon said nut and arranged concentrically with relation to the bore thereof and having a plurality of grooves in the outer edge, a coil spring locking element having oppositely directed opposite ends, one of said ends being non-rotatably engaged with said bolt and the other end being engaged with one of the grooves in said flange, and a protecting nut threaded upon said flange and retaining said spring in operative position with relation to the first-mentioned nut.

In testimony whereof I affix my signature in presence of two witnesses.

OLIVER E. NESS.

Witnesses:
W. C. HAMME,
C. W. SPAHR.

Copies of this patent may be obtained for five cents each, by addressing the "Commissioner of Patents, Washington, D. C."